L. SABO.
TROLLEY HEAD.
APPLICATION FILED SEPT. 7, 1917.
1,338,193.
Patented Apr. 27, 1920.
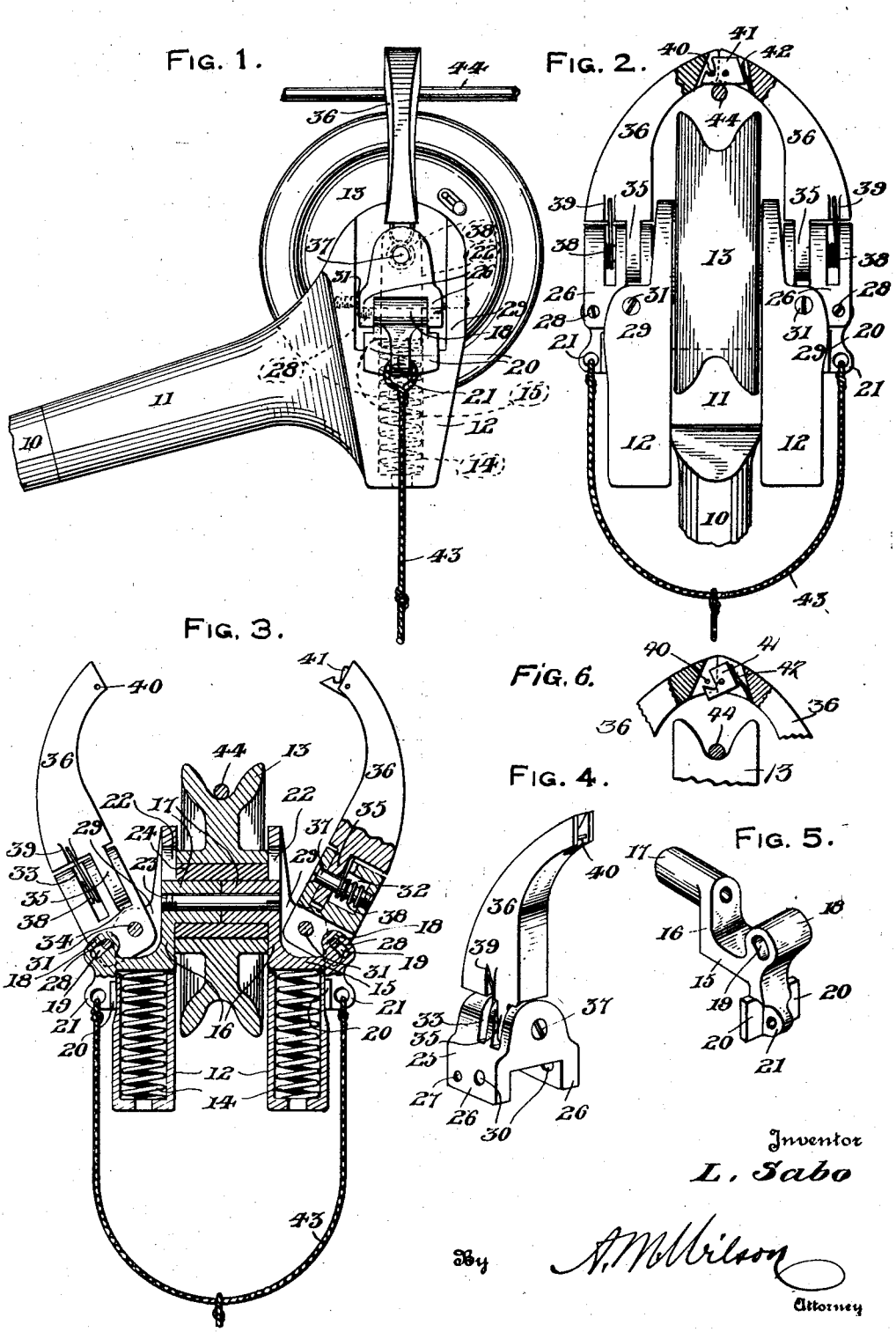

UNITED STATES PATENT OFFICE.

LOUIS SABO, OF BEAVER FALLS, PENNSYLVANIA.

TROLLEY-HEAD.

1,338,193.  Specification of Letters Patent.  Patented Apr. 27, 1920.

Application filed September 7, 1917. Serial No. 190,176.

*To all whom it may concern:*

Be it known that I, LOUIS SABO, a subject of the King of Hungary, residing at Beaver Falls, in the county of Beaver and State of Pennsylvania, have invented certain new and useful Improvements in Trolley-Heads, of which the following is a specification.

The primary object of this invention is to provide a trolley head with a pair of coöperating oppositely disposed guard arms which are automatically separated when the trolley wheel is properly positioned relative to the trolley wire, said arms being adapted to automatically move to a position toward each other wherein they overlie the trolley wheel to prevent displacement of said wheel from the trolley wire when inequalities of the trolley wire are encountered or when undue motion of the car occurs.

A further object of the invention is to provide a pair of guard arms for a trolley wheel that are operated for separation by a rope employed for positioning the trolley wheel against the trolley wire, one end of the rope being connected to sliding brackets which support the arms.

With the above general objects in view and others that will appear as the nature of the invention is better understood, the same consists in the novel construction, combination and arrangement of parts hereinafter more fully described, illustrated in the accompanying drawing and then claimed.

In the drawing forming a part of this application and in which like designating characters refer to corresponding parts throughout the several views, Figure 1 is a side elevational view of the trolley harp constructed in accordance with the present invention.

Fig. 2 is a front elevational view thereof with the coöperating ends of the guard arms shown in section and the catch lug held in latching position by the trolley wire.

Fig. 3 is a vertical sectional view of the trolley wheel head and mount with the guard arms in their open or expanded position.

Fig. 4 is a detail perspective view of one of the guard arms removed from its mount.

Fig. 5 is a detail perspective view of one of the trolley wheel and arm supporting brackets, and Fig. 6 is a detail fragmentary view, partly in section, showing portions of the wheel and guard arms with the catch in its normal position.

Referring more in detail to the accompanying drawing, the reference numeral 10 designates the end of a trolley pole having a head 11 secured thereto in any preferred manner, said head being bifurcated at its outer end to provide a pair of side members 12 between which the trolley wheel 13 is revolubly mounted. Each side member 12 is provided at the lower end thereof with a chamber or recess as shown in Fig. 3 adapted for the reception of a helical compression spring 14 forming a cushion seat for the vertically movable bracket 15. The bracket 15 is shown more clearly in Figs. 3 and 5 and includes a horizontal base portion having a vertical right angular extension 16 terminating in an outwardly directed tubular bearing portion 17. An enlarged shoulder 18 is carried by the opposite end of the base portion of the bracket 15 and is provided with a curved cam slot 19 for purposes presently to appear, while a plate 20 depends from the shoulder 18 and has an apertured enlargement 21 on its outer face. As shown in Figs. 1 and 3 the upper portions of the side members 12 are cut away as at 22 and through these cutaway portions the tubular bearing members 17, arranged at opposite sides of the wheel 13, project, the bearing members 17 being maintained in alinement with each other as illustrated by the threaded pin 23. An antifriction sleeve 24 is supported on the bearing members 17 and is received within the hub portion of the trolley wheel 13. A wheel guard is connected to each bracket 15 and side member 12 and includes a base portion 25 bifurcated at its lower end to provide a pair of arms 26 for straddling the base portion of the bracket 15, the arms 26 being provided with alined openings 27 within which a pivot pin 28 is received, said pivot pin passing through the curved cam-shaped slot 19 in the shoulder 18 of the bracket. A pair of lugs 29 formed on the side members 12 have openings therein that register with openings 30 provided in the arms 26, in which registering openings a pivot pin 31 is received whereby the bases 25 of the arms are pivotally secured to the side members 12. The upper portion of the base member 25 is provided with an interior chamber 32 while the side walls thereof are provided with oppositely disposed slots 33, a recess 34 also being provided therein for the pivotal reception of the depending finger 35 of the upper member or arm 36 of the guard. A pivot pin 37 extends transversely of the upper portion of the base member 25, and passes through the depending finger 35 and the interior chamber 32, while a coil spring 38 surrounds the pivot pin 37 within the chamber 32 and has the opposite ends thereof projecting outwardly of the side slots 33 with the terminal ends 39 in engagement with opposite sides of the arm 36. As clearly shown in Fig. 2, the contacting free ends of the arms 36 have a trolley wire actuated interlocking connection, this connection consisting in recessing the adjacent end portions of the arms 36 and arranging a keeper pin 40 in one recess adapted to be engaged by a pivoted lug 41 in the other recess, said lug being tensioned to normally disengage from the pin 40 by a spring.

From the above detailed description of the construction of the device, it is thought that the operation thereof will be apparent. It is noted that the operating rope 43 connected to the apertured lugs 21 of the brackets 15, when pulled, will lower the brackets 15 against the action of the helical springs 14 and in so doing will cause the slotted shoulders 18 which inclose the bolts 28 to lower said bolts, thus outwardly laterally swinging the base members 25 and guard arms 36 about the pivot bolts 31. During this movement, the trolley wheel 13 supported on the tubular bearing members 17 will also be lowered. As soon as the trolley wheel 13 is properly positioned against the wire 44, tension on the rope 43 is relieved and the spring usually employed at the base of pole 10 holds the wheel 13 in contact with the wire 44 with sufficient force to maintain the wheel 13 lowered and the arms 36 separated. If the wheel 13 leaves wire 44, the springs 14 will cause the brackets 15 to move upwardly and to carry therewith the guard arm base members 25 to swing the latter on their stationary pivots 31 and to move the arms 36 inwardly toward each other to the position shown in Fig. 6 wherein the catch lug 41 is normally disengaged from the keeper pin 40 so as not to retain the arms 36 against separation.

The arms in this position overlie the trolley wire 44 and when a cross-over or other lateral obstruction is engaged by the arms 36, said arms will be swung on their pivot bolts 37 against the action of springs 38, and when so positioned, the arms 36 will readily separate for passing below the wire 44 and the cross-over. The arms 36 being capable of swinging in opposite directions, it will be readily seen that damage thereto will be minimized and, in view of the peculiar resilient mounting of the wheel 13, the life thereof will be materially increased.

When the wheel 13 leaves the wire 44, the latter is prevented from passing out between the free ends of the arms 36 by engaging the catch lug 41 and moving the same into engagement with the pin 40 as shown in Fig. 2.

It is to be understood that the lug 41 at no time interlocks with the pin 40 to the extent of preventing forcible separation of the arms 36, but provides a barrier against the passage of the wire 44 out between the meeting or abutting ends of the arms 36, said lug 41 being limited in its turning movement by the pin 40.

While I have shown and described the preferable embodiment of the invention, it will be understood that various changes may be made in the details of construction thereof without departing from the spirit and scope of the invention as claimed.

What I claim as new is:—

1. A trolley wheel mount comprising a pair of side members each having a socket therein, cushioning means arranged in each socket, a pair of vertically movable bracket members, each having its base portion supported by one of said cushioning means, tubular bearing members carried by said brackets and extending inwardly through said side members, a trolley wheel journaled about said tubular bearing members, two-part guard arms pivoted to said side members for lateral movement toward and from each other, a shoulder carried by each bracket and having a curved cam slot therein, pins extending transversely of the base portions of said two-part guard arms and received in said cam slots, depending plates carried by said brackets, said plates being adapted to have an operating rope secured thereto, the upper portions of the two-part guard arms being pivotally connected to the base portions thereof for swinging forwardly and rearwardly, and coöperating latch members carried by the free ends of the guard arms.

2. A trolley wheel mount comprising a pair of side members each having a socket therein, cushioning means arranged in each socket, a pair of vertically movable bracket members, each having its base portion supported by one of said cushioning means, tubular bearing members carried by said brackets and extending inwardly through said side members, a trolley wheel journaled about said tubular bearing members, two-part guard arms pivoted to said side members for lateral movement toward and from each other, a shoulder carried by each bracket and having a curved cam slot therein, pins extending transversely of the base portions of said two-part guard arms and received in said cam slots, depending plates carried by said brackets, said plates being adapted to have an operating rope secured thereto, and the upper portions of the two-part guard arms being pivotally connected to the base portions thereof for swinging forwardly and rearwardly.

3. A trolley wheel mount comprising a pair of side members, cushioning springs supported thereby, a pair of coöperating sliding bracket members supported on said springs and projecting inwardly of said side members, a trolley wheel journaled on said bracket members, guard arms pivoted to said side members for lateral movement toward and from each other, and pin and slot operating connections between said guard arms and said sliding brackets.

4. A trolley wheel mount comprising a pair of side members, cushioning springs supported thereby, a pair of coöperating bracket members supported on said springs and projecting inwardly of said side members, a trolley wheel journaled on the inwardly projecting portions of said bracket members, guard arms pivoted to said side members for lateral movement toward and from each other, and pin and slot operating connections between said guard arms and said brackets, said pin and slot connections including cam slots formed in enlargements on said bracket members and pins carried by the guard arms.

5. A trolley wheel mount including a pair of side members, a pair of coöperating bracket members resiliently supported thereby, guard arms pivoted to said side members for lateral movement toward and from each other, pin and slot connections between said guard arms and said resiliently mounted brackets, said guard arms being formed of base and upper sections, said base sections each having an upper section hinged thereto to swing circumferentially of the trolley wheel.

6. A trolley wheel mount including a pair of side members, a pair of coöperating bracket members resiliently mounted thereon, guard arms pivoted to said side members for lateral swinging movement toward and from each other, pin and slot connections between said guard arms and said resiliently mounted brackets, said guard arms being formed of base and upper sections, said base sections each having an upper section hinged thereto to swing in opposite directions circumferentially of the trolley wheel, and means to yieldingly retain said upper sections in substantially vertical position.

7. A device of the class described including a head, a wheel mount carried thereby and capable of vertical movement relative thereto, a pair of guard members pivoted to said head for lateral swinging movement toward and from each other, yieldable means to normally maintain said wheel mount in its upper limit of movement, and operating connections between said mount and said guard arms to swing the latter and normally maintain the free ends of the same in abutting relation.

8. A device of the class described including a head, a wheel mount carried thereby and capable of vertical movement relative thereto, a pair of guard members pivoted to said head for lateral swinging movement toward and from each other, yieldable means to normally maintain said wheel mount in its upper limit of movement, operating connections between said mount and said guard arms to swing the latter and normally maintain the free ends of the same in abutting relation, and means associated with the free end portions of the guard arms to prevent the free passage of a trolley wire out therebetween when in abutting relation.

9. A device of the class described including a head, a pair of guard arms pivoted thereto for lateral movement toward and from each other, yieldable means to normally maintain said guard arms with their free ends in substantially abutting relation, and means associated with the free end portions of the guard arms to prevent the free passage of a trolley wire therebetween when in abutting relation.

10. A device of the class described including a head, a wheel mount carried thereby for vertical movement relative thereto, a pair of guard arms carried by said head for lateral movement toward and from each other, operating connections between said mount and said guard arms for moving the latter when the wheel mount is moved, and yielding means to normally maintain said wheel mount in its upper limit of movement and the free ends of the guard arms in abutting relation.

11. A device of the class described including a head, a wheel mount carried thereby and capable of vertical movement relative thereto, a pair of guard members pivoted to said head for lateral swinging movement toward and from each other, yieldable means to normally maintain said wheel mount in its upper limit of movement, operating connections between said mount and said guard arms to swing the latter and normally maintain the free ends of the same in abutting relation, and a trolley wire actuated latching means for the free ends of the guard arms.

12. A device of the class described including a head, a pair of guard arms pivoted thereto for lateral movement toward and from each other, yieldable means to normally maintain said guard arms with their free ends in substantially abutting relation, and a trolley wire actuated latching means for the free ends of the guard arms.

13. A device of the class described including a head, a wheel mount carried thereby for vertical movement relative thereto, a pair of guard arms carried by said head for lateral movement toward and from each other, operating connections between said mount and said guard arms for moving the latter when the wheel mount is moved, yielding means to normally maintain said wheel mount in its upper limit of movement and the free ends of the guard arms in abutting relation, and a trolley wire actuated latching means for the free ends of the guard arms.

14. A device of the class described including a head, a wheel mount carried thereby for vertical movement relative thereto, a pair of guard arms carried by said head for lateral movement toward and from each other, operating connections between said mount and said guard arms for moving the latter when the wheel mount is moved, yielding means to normally maintain said wheel mount in its upper limit of movement and the free ends of the guard arms in abutting relation, and means associated with the free end portions of the guard arms to prevent the free passage of a trolley wire therebetween when in abutting relation.

In testimony whereof I affix my signature.

LOUIS SABO.